(12) United States Patent
Privitt et al.

(10) Patent No.: US 7,959,699 B2
(45) Date of Patent: Jun. 14, 2011

(54) COLLAPSIBLE FILTER WITH FOLDING ARMS

(75) Inventors: Roger Privitt, Plano, TX (US); Ammar Kailani, Richardson, TX (US)

(73) Assignee: Lennox Industries Inc., Richardson, TX (US)

( * ) Notice: Subject to any disclaimer, the term of this patent is extended or adjusted under 35 U.S.C. 154(b) by 277 days.

(21) Appl. No.: 11/858,746

(22) Filed: Sep. 20, 2007

(65) Prior Publication Data

US 2009/0077937 A1 Mar. 26, 2009

(51) Int. Cl.
*B01D 46/00* (2006.01)
(52) U.S. Cl. ............... 55/496; 55/497; 55/499; 55/511; 55/521; 55/DIG. 31
(58) Field of Classification Search ............ 55/496, 55/497, 499, 500, 501, 521, DIG. 31, 511
See application file for complete search history.

(56) References Cited

U.S. PATENT DOCUMENTS

| | | | | |
|---|---|---|---|---|
| 2,915,426 | A * | 12/1959 | Poelman | 156/178 |
| 3,107,990 | A * | 10/1963 | Getzin | 55/491 |
| 3,243,943 | A * | 4/1966 | Getzin | 55/499 |
| 4,004,899 | A * | 1/1977 | Giacovas | 55/499 |
| 4,135,900 | A * | 1/1979 | Westlin et al. | 55/499 |
| 4,885,015 | A | 12/1989 | Goulet et al. | |
| 5,188,646 | A * | 2/1993 | Nolen, Jr. | 96/58 |
| 5,252,111 | A * | 10/1993 | Spencer et al. | 55/489 |
| 5,273,563 | A | 12/1993 | Pasch et al. | |
| 5,273,564 | A | 12/1993 | Hill | |
| 5,599,448 | A | 2/1997 | Spearman | |
| 5,743,927 | A | 4/1998 | Osendorf | |
| 6,102,741 | A * | 8/2000 | Boutros et al. | 439/620.06 |
| 6,123,751 | A * | 9/2000 | Nelson et al. | 95/268 |
| 6,521,011 | B1 * | 2/2003 | Sundet et al. | 55/499 |
| 6,579,337 | B2 * | 6/2003 | Heilmann et al. | 55/495 |
| 6,592,643 | B2 | 7/2003 | Shah et al. | |
| 6,652,613 | B2 | 11/2003 | Shal et al. | |
| 6,740,137 | B2 * | 5/2004 | Kubokawa et al. | 55/521 |
| 6,814,773 | B2 | 11/2004 | Shah et al. | |
| 6,986,842 | B2 * | 1/2006 | Bortnik et al. | 210/232 |
| 7,156,891 | B2 * | 1/2007 | Winters et al. | 55/497 |
| 7,452,396 | B2 * | 11/2008 | Terlson et al. | 55/496 |
| 7,537,630 | B2 * | 5/2009 | Schuld et al. | 55/496 |
| 2004/0182055 | A1 * | 9/2004 | Wynn | 55/497 |

* cited by examiner

*Primary Examiner* — Robert A Clemente

(57) ABSTRACT

The present invention addresses the need for a collapsible filter that is easily assembled and installed. The collapsible filter comprises top and bottom arms rotatably attached to the top and bottom edges of two end caps. A pleated filter media is provided attached to at least one of the end caps. The present invention also addresses the need for mechanisms to facilitation the expansion of the pleated filter media, utilizing spring-like devices or other materials that may be compressed but expand to a natural state. Similarly, the present invention further addresses the need for mechanisms that allow for controlling the distance between adjacent pleats within a pleated, collapsible filter media. The present invention recognizes that a combination of these approaches may be utilized to provide a collapsible filter that is easily constructed at a manufacturing facility, assembled in the field, and installed within a system having need for a filter.

10 Claims, 4 Drawing Sheets

COLLAPSIBLE FILTER WITH FOLDING ARMS

BACKGROUND OF THE INVENTION

1. Field of the Invention

The present invention relates to a method and apparatus for the on-site assembly of a collapsible filter for installation into a system having need for a filter.

2. Technical Background

Use of disposable air filters in the air distribution system of a building has provided an efficient and economical method of removing undesirable particulate matter from the air. In its simplest form, a rectangular piece of filter media material is mounted in a cardboard filter frame, with the combination then being mounted in a filter cabinet or an air duct somewhere in the air distribution system. With a hot air furnace, it is common practice to place the filter in a filter cabinet just upstream of the fan so as to filter the return air as it enters the furnace from the return air duct. When the filter is spent, i.e. when it has collected a sufficient amount of particulate matters as to be considered "full", then it is removed and replaced with a new filter. In order to maximize the amount of particulate matter that may be filtered by a particular filter thereby increasing its service life, it is desirable to increase the surface area of the filter.

One way to increase the surface area of a filter, without increasing the overall dimensions, is to introduce accordion-like pleats into the filter media. Introducing pleats into the filter media, increases the thickness of the pleated filter media when compared to a non-pleated filter, but provides a larger effective surface area to allow the filter media to collect more particular matter without significantly decreasing the flow through the filter media. The result is a much longer service life for the pleated filter media compared to a non-pleated filter. When using a pleated filter media, a number of available materials may be used. Paper is one of the most-cost effective materials that can be used as a filter media as it can be suitably folded to provide a plurality of pleats. In addition to paper, it is also common to use synthetic materials or cotton to provide for filters of varying costs and efficiencies.

Although pleated filters are widely used, one of the biggest challenges when using pleated filters is that the filters are generally bulky compared to the individual parts. With pleated filters, the thickness of the filter can be as much as 4 inches in thickness or greater in some configurations and be several feet in both height and width. However, the pleated filter material is not as bulky if compressed because a pleated design inherently introduces a large amount of empty space into the volume of the filter media. In fact, the pleated filter material, if removed from the cardboard frame, may compress down to a size that is as much as one-tenth that of the filter when assembled.

It would be desirable for an installer, whether it be a professional serviceperson or a homeowner, replacing the air filter contained within an HVAC (heating, ventilation, air conditioning) system to be able to use collapsible filters that require less space when stored before installation and can be transported in the smaller collapsed form-factor. Benefits of transporting and providing the collapsed filter to an end installer include reduced transportation costs and reduced storage space requirement. Thus, a greater number of filters and a plurality of different filter sizes can be provided given a particular volume of storage space. In addition to being able to transport and store a filter in a small space, it is also necessary that the filter be easily assembled and installed.

To provide simple installation and assembly, it would therefore be desirable for the collapsible filters to provide mechanisms that facilitate the expansion of the filter media. Similarly, it would also be desirable to provide a collapsible filter that provides a mechanism for restricting the maximum spacing between two adjacent pleats of the filter media. In known prior art collapsible filters, it is necessary to insert an additional piece between each pleat of the filter media after expansion of the filter media. Inserting this additional piece requires manual separation of each pleat within a filter and insertion of a finger of the additional piece between the pleats. If the pleats of the filter media are numerous it is readily apparent that this process can be very labor-intensive requiring a significant amount of time and dexterity to provide the ideal spacing between the pleats of the filter media. By providing a means for facilitating the spacing of the filter pleats within the filter media, the convenience of installing the filter is significantly increased with the additional benefit of providing the ideal spacing without an additional components or pieces. It would also be desirable to use a combination of a mechanism for facilitation of the expansion of the filter media and a mechanism for restricting the maximum spacing between pleats of the filter.

In view of the aforementioned shortcoming in the prior art implementations, improved apparatus and methods for creating, assembling, and utilizing a collapsible air filter are needed. Such apparatus require that the collapsible filter be easily contained in a collapsed form to minimize the space required during transportation and storage of the collapsible filter in the collapsed state. Further, the collapsible filter must also be easily assembled in the field by a professional installer, homeowner, or business owner with a minimal amount of tools, training, and time.

SUMMARY OF THE INVENTION

One aspect of the present invention is to provide a filter that is collapsible for storage and transportation and can be easily expanded and assembled for installation in an HVAC system. In one embodiment of the present invention, the filter media is a collapsible structure with an end cap attached to opposite ends of a collapsible filter media. Attached to either the top or bottom edge of each end cap is a folding arm that rotates around the top or bottom edge of the end cap. When rotated around the top or bottom edge, the folding arms form the top or bottom of the filter frame when assembled. In some embodiments of the present invention, the end caps and folding arms also feature side rails that extend inward, i.e. covering the filter media when assembled. The side rails serve to secure, at least in part, the filter media within the filter frame.

In another embodiment of the present invention, each of the end caps also feature an additional second arm at the top or bottom edge of the end cap such that each end cap has a first bottom arm rotatably attached at the bottom edge of the end cap and a top arm rotatably attached at the top edge of the end cap. When these four folding arms are rotated around the top and bottom edges of the end caps so that they extend in a roughly perpendicular manner from the end caps, they engage the opposing top or bottom arms of the opposite end cap. The folding arms may overlap to varying degrees to enhance the rigidity of the filter frame. In yet another embodiment of the present invention, a first end cap may not have either a top or bottom arm, while the opposing, second end cap may feature both a top and bottom folding arm attached at the top and bottom edges of the end cap, respectively. In such an embodiment, the top and bottom folding arms are designed to securely engage the first end cap when rotated around the respective top and bottom edges of the second end cap.

Yet another aspect of the present invention is to provide structures that facilitate the expansion and spacing of the filter media. The filter media is frequently constructed with a porous material, such as paper, cotton, or synthetics, and may lack the necessary rigidity to maintain proper spacing between the pleats of the filter media when assembled. In some embodiments of the present invention, the collapsible filter media contains a mechanism for facilitating the expansion of the filter media when the filter is being assembled. Although not an all-inclusive list, examples of mechanisms for facilitating the expansion of the filter media include collapsible finger structures, as described herein, or a coil spring integrated into the filter media for expanding the filter media.

In addition to providing structures that facilitate the expansion of the filter media, another aspect of the present invention is to provide structures that restrict the spacing of the filter media to prevent the pleats of the filter media from separating excessively resulting in too much spacing between pleats. As discussed previously, the filter media may lack the rigidity to provide the ideal, proper spacing of the pleats within the filter media. In order to facilitate the spacing of the pleats, the filter media may contain a mechanism for restricting the expansion of the filter media such that when the filter is being assembled the distance between two adjacent pleats cannot exceed a predetermined amount. Although not an all-inclusive list, examples of mechanisms for facilitating the expansion of the filter media include one or more ribbons or strings attached, in some way, to the plurality of pleats of the filter media.

Additional features and advantages of the invention are set forth in the detailed description which follows and will be readily apparent to those skilled in the art from that description, or will be readily recognized by practicing the invention as described in the detailed description, the drawings and the appended claims.

It is to be understood that both the foregoing general description and the following detailed description present exemplary embodiments of the invention as well as certain preferred embodiments. As such, the detailed description is intended to provide an overview or framework for understanding the nature and character of the invention as recited in the claims contained herein. The accompanying claims are included to provide a further understanding of the invention, and are incorporated into and constitute a part of this specification. The drawings illustrate various preferred embodiments of the invention, and together with the detailed description, serve to explain the principles and operations thereof. Additionally, the drawings and descriptions are meant to be merely illustrative, and are not intended to limit the scope of the claims in any manner.

Figure 1:
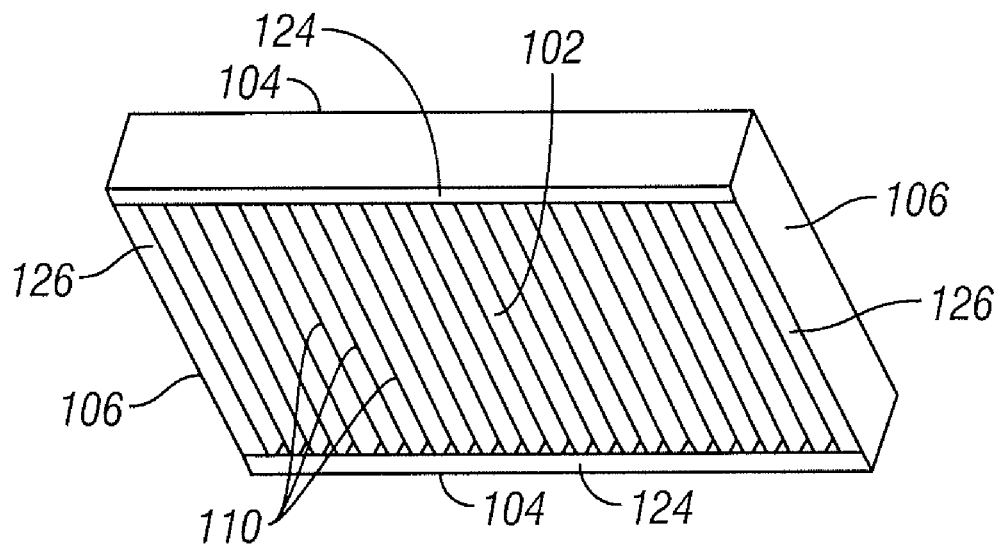
FIG. 1 depicts a typical, framed air filter known in the prior art and the common aspects of such an air filter.

REFERENCE NUMERALS 102 filter media
104 top and bottom caps
106 end caps
110 pleats
124 top and bottom side rails
126 end cap side rails
204 folding arms
230 holes
304 folding arms
502 string
504 ribbon
506 collapsible fingers
508 coil spring

DETAILED DESCRIPTION OF THE PREFERRED EMBODIMENTS

Reference will now be made in greater detail to various embodiments of the present invention. Whenever possible, the same reference numerals will be used throughout the drawings to refer to the same or similar parts. A typical filter media is shown herein for use with the various embodiments of the present invention merely for purposes of convenience. It should be understood, however, that the apparatus and methods for constructing and assembling a collapsible filter disclosed herein may be applied to a variety of different filter media and corresponding frame structures. Accordingly, the invention should not be construed as being limited in any manner by the examples presented herein and should be construed as broadly as possible in view of the claims.

Referring now to FIG. 1, a typical prior art air filter is depicted to help explain the terminology used within the present application and better highlight the novel aspects of the present invention. The air filter assembly is essentially formed around the filter media 102 with a filter frame generally constructed of cardboard but may also be of plastic or other synthetic material, surrounding the filter media 102. The filter media 102 is generally composed of a porous material, such as paper, cotton, or synthetics, depending on the application. Further, the filter media 102 usually contains a plurality of pleats 110 to increase the effective surface area of the filter media. The increased surface area facilitates increased filter capacity resulting in better air flow through the filter over a longer service lifetime. The filter media is contained within a filter frame comprised of a pair of end caps 106 and a top and bottom 104 of the filter frame. The filter media 102 is generally secured within the filter frame at the time of construction to prevent any movement of the filter media 102 and ensuring that the pleats 110 are equally spaced. Many air filters use adhesives to maintain the position of the pleats along the top and bottom of the filter frame, while other air filters use metal mesh to maintain the position of the air filter media and still others use a combination of both adhesives and metal mesh. Further the typical prior art air filter may also contain side rails that extend inward from the end caps and top and bottom sides of the filter frame. These side rails further secure the filter media within the filter frame and as such provide a better seal to prevent unfiltered air from by-passing the filter. In the depicted example the end caps 106 and top and bottom 104 feature side rails 124, 126 that extend a short distance over the filter media 102.

Figure 2:
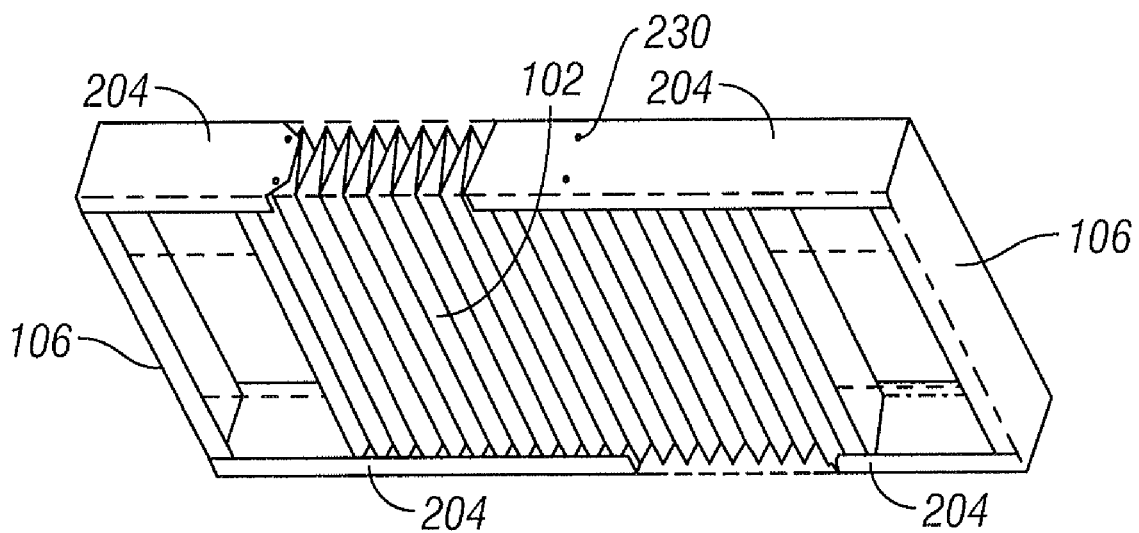
FIG. 2 depicts an improved air filter that is collapsible according to the present invention with a filter media.

Referring now to FIG. 2, a collapsible air filter according to the present invention is depicted. In this depicted structure, the filter media 102 is shown unsecured to either end cap 106 for purposes of illustration, however in many embodiments it is desirable to attach one or both end caps to a first and second end of the filter media during initial construction at a manufacturing facility. This minimizes the number of individual parts shipped and simplifies the installation for an unsophisticated user. Both end caps feature a pair of folding arms 204 that form the top and bottom of the filter frame when the folding arms 204 are positioned perpendicularly to the end caps 106 as shown. The corresponding top arms 204 may overlap each other and be secured by a variety of means including using one or more holes 230 and fastener(s) (not shown) to secure the respective top arms 204 together forming a top portion of the filter frame. Similarly, the bottom arms 204 may also overlap and be secured by a variety of means, including fasteners (not shown) through the holes 230 of each bottom arm 204 forming a bottom portion of the filter frame. It is also contemplated that adhesives may be used to secure the corresponding top or bottom arms 204 together. A person having ordinary skill in the art would recognize that a variety of different means may be used to secure the corresponding arms once the need is identified according to the present invention. The use of the holes 230 for the top and bottom arms 204 may be better viewed with reference to the end cap structure and folding arms as assembled in FIG. 4.

Figure 3:
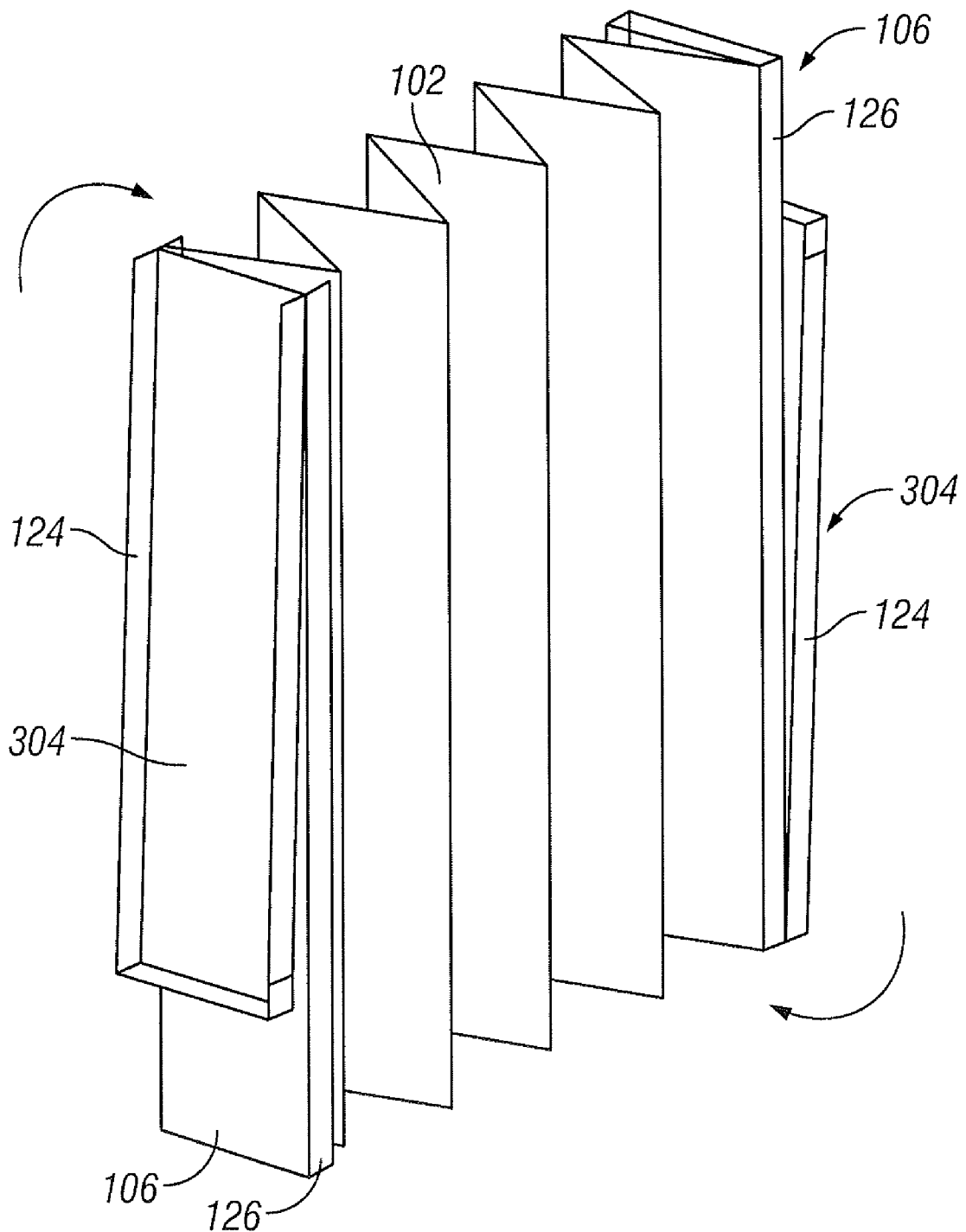
FIG. 3 depicts another improved air filter according to the present invention that is collapsible, features folding arms and may be assembled immediately prior to installation within the HVAC system.

Referring now to FIG. 3, an exemplary embodiment of the present invention is depicted. The filter media 102 is atypical in that it has only a few pleats, however this is primarily done to better illustrate the opposing end caps, and it should be understood that the thickness and pleat count of the filter media is not a critical feature of the present invention. In the depicted exemplary embodiment, the two end caps 106 are shown with the filter media 102 attached thereto. The filter media 102 is typically glued or mechanically attached into the cavity formed by the end cap 106 and the side rails 126. In this embodiment, each of the end caps 106 has a folding arm 304 with side rails 124 extending from the edges of the folding arms. When the top arm and bottom arm 304 are rotated around the top or bottom edges of the end caps 106 as illustrated by the arrow, the folding arms 304 and end caps 106 form a filter frame for containing the filter media 102. The folding arms 304 are of suitable length such that each arm 304 engages the opposing end cap 106 and the filter media is contained within the top or bottom folding arms 304 and the side rails 124 of the arms 304 such that the side rails 124 extend over a short distance of the filter media 102.

Figure 4:
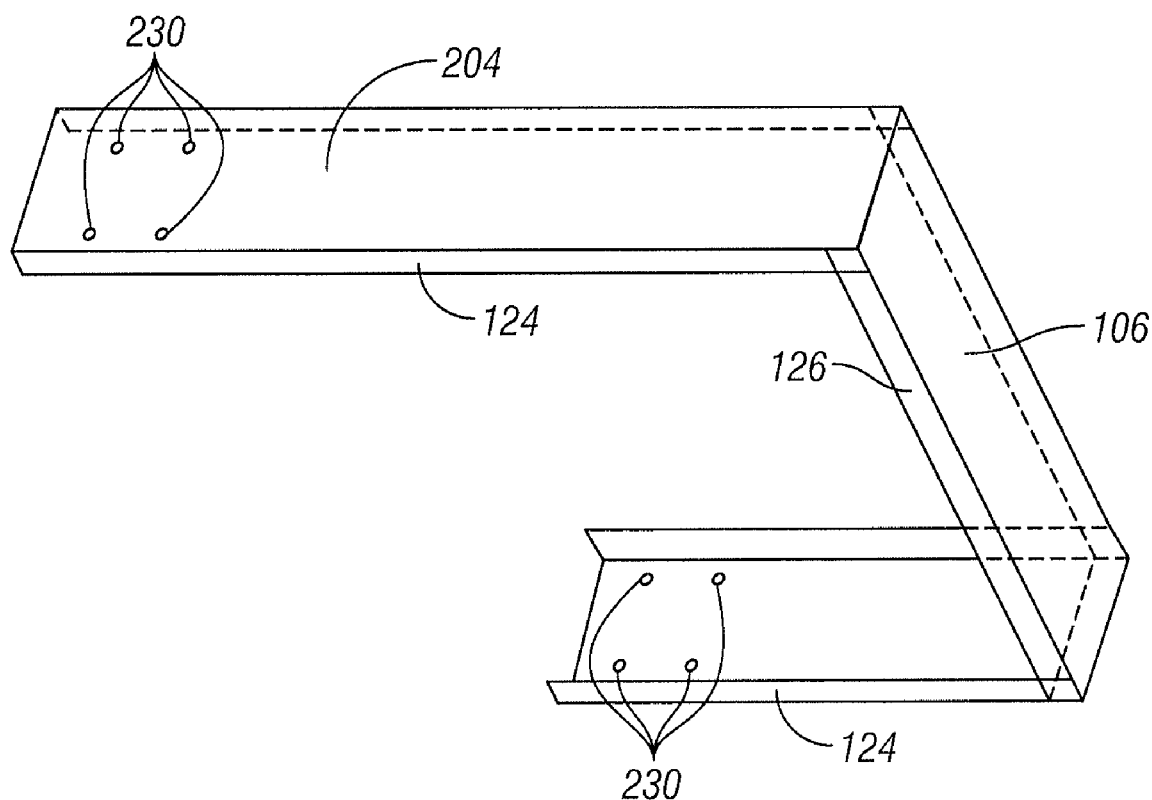
FIG. 4 depicts an end cap, without the filter media shown, folded into a J-shaped structure. The depicted end cap, when used in combination with an identical end cap and a collapsible filter media, is representative of an exemplary embodiment of the present invention.

As an alternative to the single arm end caps depicted in FIG. 3, FIG. 4 depicts an end cap structure with both a top and bottom arm 204 extending from the end cap 106. In this depicted embodiment, the folding arms 204 have already been rotated around the pivot points located at the top and bottom edges of the end cap 106 and are positioned such that the end cap 106 and folding arms 204 form a J-shaped structure. A person having ordinary skill in the art would instantly recognize that an identical J-shaped structure could be combined with the depicted structure to form a rectangular filter frame, similar to that depicted within FIG. 2. The top and bottom arms 204 as depicted feature side rails 124 and may also contain holes 230 or adhesive at the distal ends of the top and bottom arms 204 used for securing the arms 204 to opposing arms. The holes 230 are positioned so as to correspond to the holes of the top and bottom arms 304 of an opposite, yet identical, end cap (not depicted). This is very similar to the pair of end caps 106 depicted in FIG. 2 with a filter media contained therein. As discussed previously, any type of fastener or adhesive may be used to secure the corresponding top and bottom arms 204 to one another. If adhesive is used, the arms may be glued together using an adhesive provided by the installer or the adhesive may be already provided on the arms such as a factory-installed adhesive on the interior or exterior sides of the arms. Also, it should be noted that adhesive may also be provided by the installer or at the factory to facilitate the positioning of the top and bottom arms 204 by providing adhesive where the top and bottom side rails 124 engage the end cap side rails 126. This may provide additional rigidity and support to the filter frame, especially for a J-shaped structure as depicted in FIG. 4.

Figure 5:
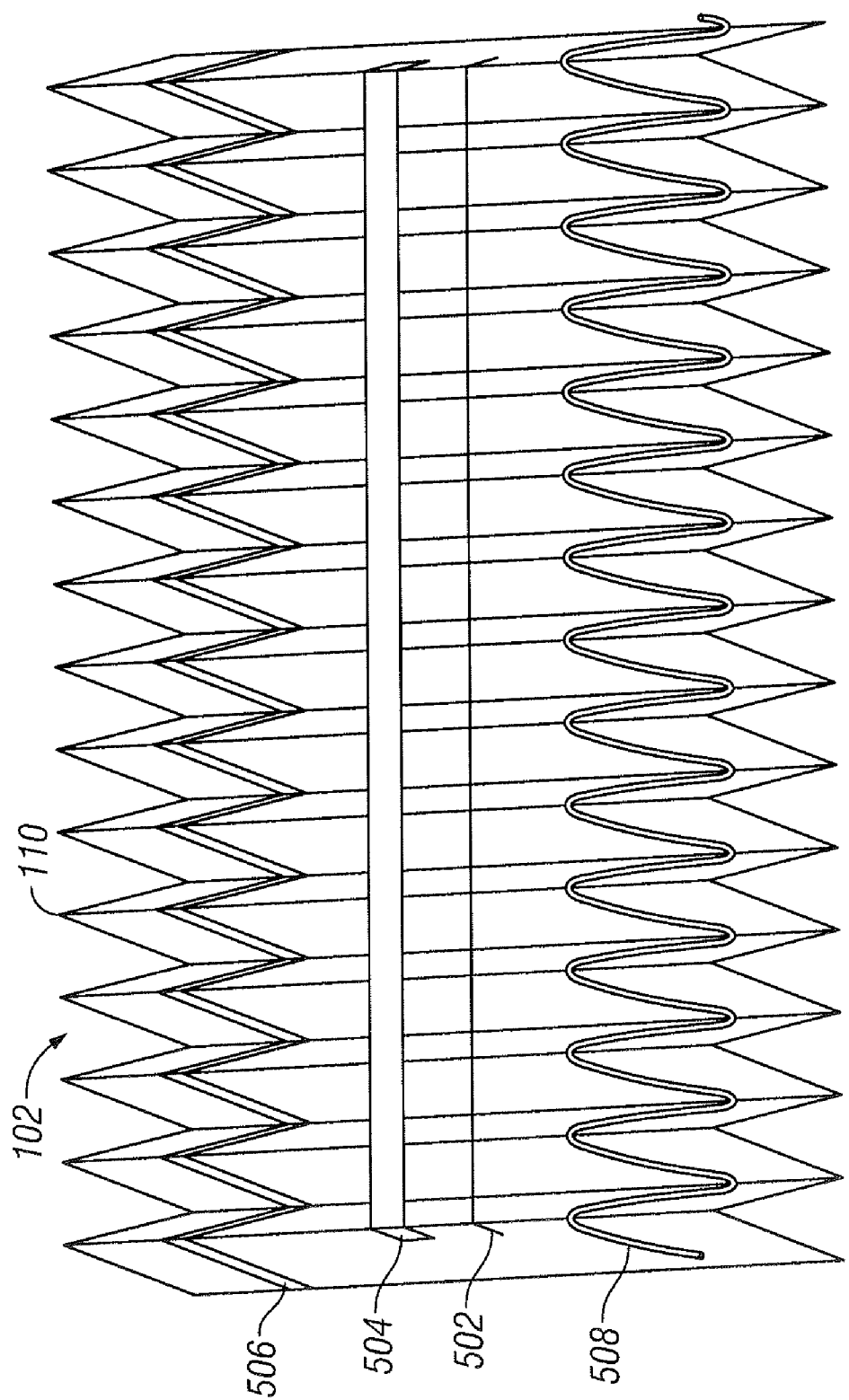
FIG. 5 depicts filter media with examples of mechanisms for facilitating the expansion of the pleated filter media and mechanisms for restraining the expansion of the pleated filter media.

Referring now to FIG. 5, examples of mechanisms for facilitating the expansion and restraint of the pleats of the filter media are shown. FIG. 5 depicts a filter media 102 absent any frame or end caps as described previously for purposes of simplifying the illustration. The depicted filter media 102 depicts four different mechanisms as contemplated by the present invention for purposes of illustration although it is fully contemplated that additional structures and mechanisms may be readily applied after recognizing the advantages of the exemplary embodiment. One mechanism depicted is a simple string 502 used to restrain the pleats from over expansion. The string 502 is attached at the tip of each pleat of the filter media 102, preferably with an adhesive, such that the string 502 prevents the pleats of the filter media 102 from expanding further than the distance defined by the length of the string 502 between any two adjacent pleats. Ideally, such string 502 would be attached to both the front and back sides of the filter media 102 to ensure that the pleats are equally distributed on both sides of the filter media 102. This is especially important when using thicker pleated filter media 102. Alternatively a string 502 can be used that is not attached at the tip of each pleat of the filter media 102 but defines only the total distance the filter media can expand as determined by the length of the string 502. Similarly, a ribbon 504 is depicted as an exemplary mechanism for restraining the maximum distance between any two pleats of the filter media. The advantage to using a wider ribbon 504 is that a ribbon 504 may provide some vertical stiffness when compared with a string 502 and may also offer an aesthetic advantage over a string 502. A ribbon 504 that is not attached to the tip of the pleat can also be used as described above in reference to the string by defining the total length the filter media can extend. Both of the exemplary embodiments of restraining mechanisms, if properly used, will ensure that the filter media 102, when expanded to the proper length has the requisite distance between adjacent pleats to ensure maximum airflow.

In addition to the restraining mechanisms depicted in FIG. 5, mechanisms for facilitating the expansion of the filter media 102 are also depicted. Expansion mechanisms may be useful for assisting an installer or homeowner in expanding the filter media 102 after removal from a storage box or container. The first example of a mechanism for facilitating the expansion of the filter media 102 is to provide collapsible fingers 506 installed within the filter media 102 upon initial construction at a manufacturing facility. The collapsible fingers 506 are generally constructed from some material that returns to an original shape after removal of the filter media 102 from the storage box or container. Spring metal is one type of material that is suitable for use as collapsible fingers 506 in the present invention. In such an embodiment, the fingers would form an accordion-like shape, having similar contours to that of the pleated filter media 102, and be inserted into the filter media 102 at the manufacturing facility. When the filter media 102 is removed, the accordion compressible fingers 506 expand forcing the pleats of the filter media 102 to expand as well. In addition to using spring metal, it may be possible to use compressible foam fingers to provide the spacing between the pleats of the filter media 102. Some compressible foam known in the art can compress down to a fraction of its original size and provide the structural rigidity necessary for providing adequate spacing the pleats of the filter media 102.

FIG. 5 also depicts another example of a mechanism for facilitating the expansion of the pleated filter media 102 after removal from the storage box or container. The bottom most mechanism depicted in FIG. 5 is an ordinary coil spring 508 integrated into the filter media 102. The coil spring 508 forces the pleats of the filter media 102 to expand when the compressive force provided by the storage box, container, or other mechanism is removed. Ideally, the natural length of the coil spring 508 after considering the damping effects of the filter media 102 would be approximately the same length as the desired length of the air filter when assembled into a final form. The advantages of using a coil spring 508 is that the filter media will be very evenly spaced when the spring reaches its natural length. However, the coil spring 508 may allow some vacillation of the spacing of the pleats of the filter media 102 at its natural length when utilized within an air filtration system. In order to counteract this effect, it may be desirable to use a combination of a coil spring 508 with a natural length longer than that of the filter media 102 when assembled and utilizing a restraining mechanism such as a ribbon 504 or string 502. Stiffer coil springs 508 can also help minimize the effect. It is contemplated that embodiments of the present invention will likely incorporate a plurality of the mechanisms disclosed for restraining and expanding the filter media 102 depending on the particular implementation and constraints. Further it is contemplated that additional mechanisms may be used within the present invention without diverging from the scope of the present invention as claimed.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

We claim:

1. A collapsible filter assembly comprising:
   a pleated filter media having a plurality of pleats and a first end and a second end, a first end cap attached to the first end of the pleated filter media having a first top arm and a first bottom arm rotatably attached, and
   a second end cap attached to the second end of the pleated filter media having a second top arm and a second bottom arm rotatably attached, wherein the first top arm and the second bottom arm are a first length and the second top arm and the first bottom arm are a second length that differs from the first length, wherein the first top arm and the second top arm are manufactured to overlap when positioned perpendicular to the first end cap and the second end cap to form a top portion of a filter frame for the collapsible filter assembly, the first top arm or the second top arm including a securing means that is positioned thereon to secure the first top arm and the second top arm together to form the top portion of the filter frame, the first top arm, the second top arm, the first end cap and the second end cap including side rails that are positioned to extend over the pleated filter media when the filter frame is formed, at least some of the side rails including an adhesive that is positioned where the side rails of the first and the second top arm engage the side rails of the first and second end caps.

2. The collapsible filter of claim 1 further comprising an expanding mechanism attached to and collapsible with the pleated filter media, wherein the expanding mechanism forces the pleats of the pleated filter media to separate from one another.

3. The collapsible filter of claim 2 further comprising a restraining mechanism attached to the pleated filter media wherein the remaining mechanism limits the distance between each pair of adjacent pleats of the pleated filter media.

4. The collapsible filter of claim 2 wherein the first bottom arm and the second bottom arm are manufactured to overlap when positioned perpendicular to the first end cap and the second end cap to form a bottom portion of the filter frame.

5. The collapsible filter of claim 4 wherein the first bottom arm or the second bottom arm includes a securing means that is positioned thereon to secure the first bottom arm and the second bottom arm together to form a bottom portion of the filter frame.

6. The collapsible filter of claim 1 further comprising a restraining mechanism attached to the pleated filter media wherein the remaining mechanism limits the distance between each pair of adjacent pleats of the pleated filter media.

7. The collapsible filter of claim 1 wherein the securing means is an adhesive.

8. The collapsible filter of claim 1 wherein the securing means includes at least one hole configured to receive a fastener.

9. The collapsible filter of claim 1 wherein the side rails of the first and the second top arm and the side rails of the first and second end caps overlap when the filter frame is formed to create overlaps.

10. The collapsible filter of claim 9 wherein the adhesive is positioned at the overlaps.

* * * * *

UNITED STATES PATENT AND TRADEMARK OFFICE
CERTIFICATE OF CORRECTION

| | | |
|---|---|---|
| PATENT NO. | : 7,959,699 B2 | Page 1 of 1 |
| APPLICATION NO. | : 11/858746 | |
| DATED | : June 14, 2011 | |
| INVENTOR(S) | : Privitt et al. | |

It is certified that error appears in the above-identified patent and that said Letters Patent is hereby corrected as shown below:

Column 8

Line 26, "remaining" should be replaced with -- restraining --.

Line 40, "remaining" should be replaced with -- restraining --.

Signed and Sealed this
Thirteenth Day of September, 2011

David J. Kappos
*Director of the United States Patent and Trademark Office*